July 3, 1923.

R. E. WINTERS 1,460,692

ADJUSTABLE CRANK PIN

Original Filed April 22, 1921    2 Sheets-Sheet 1

INVENTOR
Robert E. Winters
by William B. Wharton
his attorney

July 3, 1923.

R. E. WINTERS

ADJUSTABLE CRANK PIN

Original Filed April 22, 1921   2 Sheets-Sheet 2

1,460,692

INVENTOR
Robert E. Winters
by William B. Wharton
his attorney

Patented July 3, 1923.

1,460,692

UNITED STATES PATENT OFFICE.

ROBERT E. WINTERS, OF CORAOPOLIS, PENNSYLVANIA, ASSIGNOR OF ONE-HALF TO ANTHONY C. DEAN, OF PITTSBURGH, PENNSYLVANIA.

ADJUSTABLE CRANK PIN.

Application filed April 22, 1921, Serial No. 463,547. Renewed November 21, 1922.

*To all whom it may concern:*

Be it known that I, ROBERT E. WINTERS, a citizen of the United States, and resident of Coraopolis, in the county of Allegheny and State of Pennsylvania, have invented a new and useful Improvement in an Adjustable Crank Pin, of which the following is a specification.

This invention relates to an adjustable pitman, and particularly to a pitman which is automatically adjustable.

The pitman shown and described herein comprises substantially the structure of that shown and described, but not claimed in copending application Serial No. 366,490, filed March 17, 1920, and is shown as applied to the general speed change mechanism more particularly described, and claimed, in companion application Serial No. 461,560, filed April 15, 1921.

One object of the invention is to provide means comprising a positively driven wheel and power transmitting pin therein, whereby the position of the pin may be automatically adjusted to vary the length of stroke thereof.

A more specific object of the invention is to provide means on the driven shaft of an engine whereby the length of stroke of a pitman pin is automatically decreased upon a decrease of engine speed, thereby increasing the force transmitted; and is automatically increased upon increase in engine speed, thereby increasing speed at a sacrifice of the force transmitted.

A further object of the invention is to provide means, of the nature specified, which are simple and compact, and which may be readily applied to the driving means of a power propelled vehicle.

Figure 3:
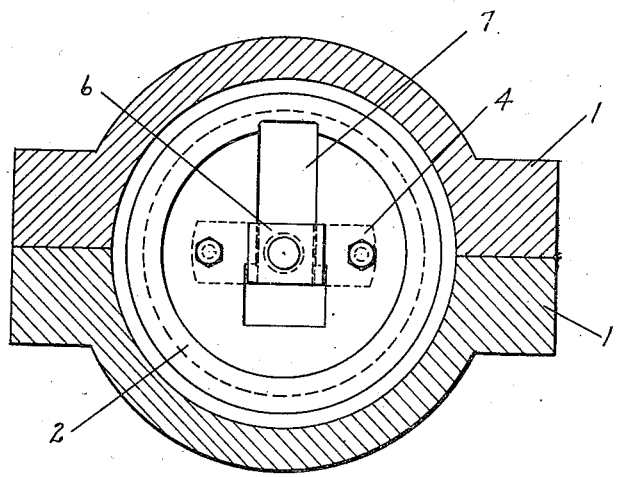
Figures 1, 2:
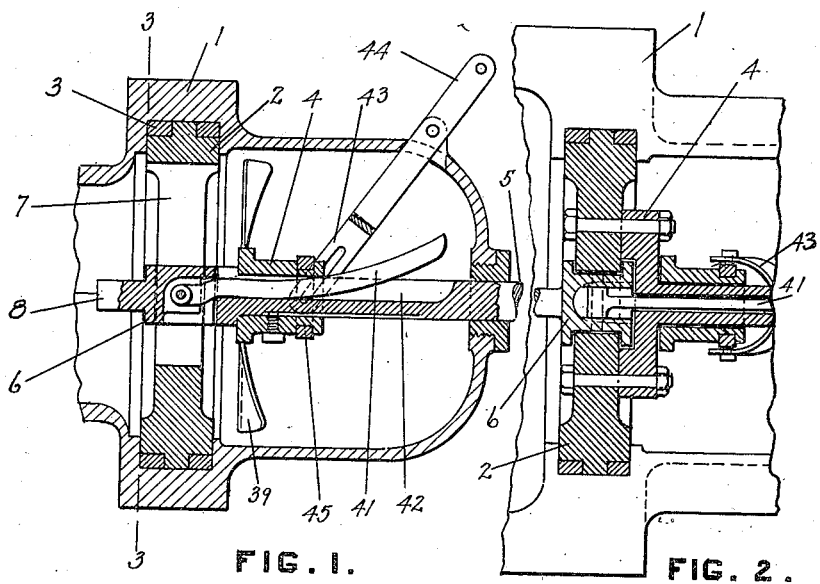
Figures 4, 5:
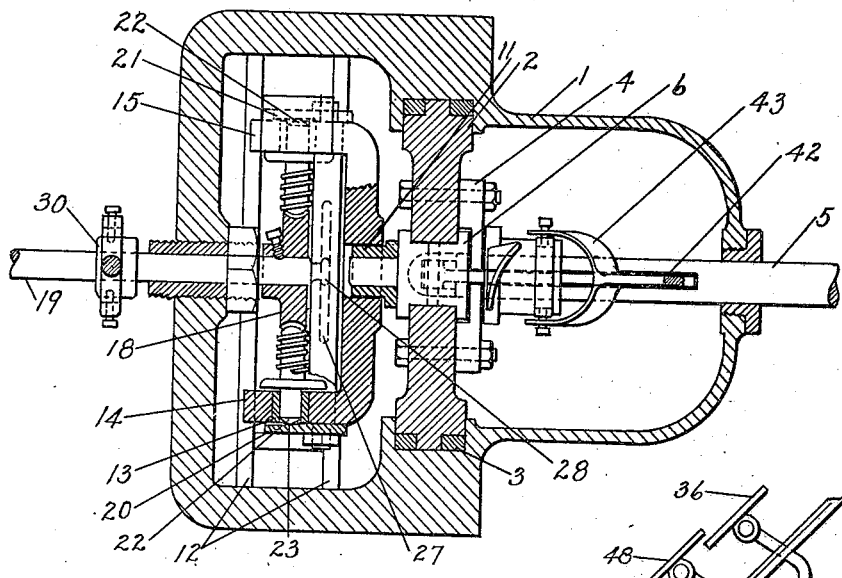

In the accompanying drawings Figure 1 is a front elevation of the adjustable pitman of the present invention with the operating connections therefor removed; Figure 2 is a view showing the pitman in central vertical section; Figure 3 is a central view therethrough in horizontal section; Figure 4 is a central vertical section through the adjustable pitman and speed change mechanism to which it is applied; and Figure 5 is a central horizontal section through the same mechanism.

In the drawings the reference numeral 1 designates a housing for containing the parts of the mechanism. Rotatably mounted in housing 1 is a wheel 2, between which and the housing are preferably interposed one or more anti-friction bands 3. Wheel 2 is rigidly secured as by means of a small bracket 4, with the engine shaft 5 to rotate therewith. A cross head or block 6 is slidable in a slot 7 in the wheel and carries a pin 8 for the transmission of power to the other portions of the mechanism.

The pin 8 enters a slot 9 in alignment with the slot 7 in wheel 2; this slot 9 being in a reciprocable member 10 slidably mounted transversely of housing 1. Reciprocating movement is imparted to member 10 by the action of pin 8 in the slot 9, the length of stroke of the reciprocating member depending obviously upon the eccentricity of the pin 8. Pin 8 is surrounded by a bushing 11 to completely fill the slot and prevent any torsional stresses upon the pin.

Slide 10 is slidable on tracks 12 in the frame 1, the frame being of sufficient width in this portion to permit of a stroke of the maximum desired length. Freely rotatable in bearings 13 in the end members 14 and 15 of slide 10, are a pair of worm racks 16 and 17 in vertical alignment with each other. Meshing with both of said racks is a worm gear 18 directly connected with the power shaft 19, so that reciprocating movement of the worm is converted into movement of rotation of the power shaft.

With the structure so far described, however, the rotation of the power shaft would be in alternately reversed directions. As it is necessary for most useful work, such as the transmission of motive power for an automobile, that the power shaft be rotated in a uniform direction; special means are provided for securing this uniform direction of rotation.

These means comprise primarily plates 20 and 21 of the general form of a bell crank lever and rotatably mounted one on each of the outer surfaces of the end members 14 and 15 of slide 10. The inner faces of the plates 20 and 21 are contacted by the points of cones 22 on the ends of the worm racks 16 and 17. In the regions adjacent the point of contact with these cones the inner faces of each of the plates 20 and 21 are cut away on an angle to form the cam surfaces 23.

The racks 15 and 16 are slidable in their bearings and each is provided with a pair of enlarged shoulders 24 and 25 arranged to contact or be freed from contact with the inner surfaces of end members 14 and 15 according to the position of the rack.

The theory of operation of this portion of the device is that the racks are alternately uncentered during strokes of the slide in opposite directions; and that the uncentered rack is held against rotation to act upon the worm gear while the other rack is free to be rotated idly thereby. This effect is obtained by the position of the contacts. With reference to Figure 5 of the drawings, the plate 20, shown as the lower of the two plates in this figure of the drawings, is in such position that the contact point 22 bears thereagainst to free shoulder 24 of the rack from contact with side portion 14 of the slide, while forcing shoulder 25 into contact with side portion 15.

If the slide is moving in a direction which corresponds to a downward movement with reference to Figure 5 of the drawings, portion 15 of the slide, bearing against shoulder 25 downwardly of the pitch line of the rack, uncenters the rack and holds it against rotation so that it acts upon worm gear 18 to cause rotation of the same. During movement of the slide in opposite direction, the bearing point is on the point of the cone 22 of the rack at or adjacent its pitch line so that the rack is free to rotate idly.

With the other rack 17, the positions must be reversed so that shoulder 24 is in contact with portion 14 of the rack and shoulder 25 is free to permit the rack to have bearing upon the point of the cone 22 which is disposed at the same end of the rack as the shoulder 25. Rack 17 is thus free to rotate when rack 16 is held and is held when rack 16 is free to rotate.

As the action of the racks depends upon the position of the beveled or cam surfaces of the plates 20 or 21 the action of the racks and direction of rotation of worm gear 18 and power shaft 19 may be reversed by shifting the position of the plates. For this purpose the shaft 26, to which plates 20 and 21 are rigidly secured, is provided with a longitudinally extending notch 27. In this notch engages the shoulder 28 of power shaft 19. The power shaft 19 is slidable in the hub 29 of the worm gear, and shoulder 28 engages in the notch 27 of shaft 26 in such manner that the shaft is freely slidable thereon. Engaging power shaft 19 by means of a collar 30 is an operating lever 31 by means of which the plates 20 and 21 may be so shifted as to change the position of the cam surfaces and thus cause a reversal in the direction of rotation of worm gear 18 and power shaft 19. This reversal is due to the fact that the change in the position of the plates causes the outer contact members or shoulders which were previously free to be brought into contact with the slide, while at the same time the outer contact members which previously bore against the slide will be freed and the entire bearing at their end of the racks will be provided by the points of cone 22.

For actuation of lever 31, the lever may be provided with curved extensions or horns 32 and 33. As shown, extension 32 is hinged at 34 to the exterior of housing 1, while extension of 33 communicates with a rod 35 terminating in an operating pedal 36. A coiled spring 37 lying in cup 38, formed exteriorly of housing 1 and bearing against lever 31, serves to maintain the lever normally in its released position.

When applied to a power propelled vehicle, the mechanism serves as a brake as well as a speed change mechanism. The braking action of the device is secured by operating reversing lever 31 to change the position of plates 20 and 21 without, however, changing their position sufficiently to cause a reversal in the direction of rotation of worm gear 18. This action serves to slightly uncenter both of the racks 16 and 17 during movement of the slide in both directions so as to retard their rotation, without holding either rack absolutely rigid during movement of the slide in either direction.

The mechanism described above is identical with that claimed in copending application Serial No. 461,560, filed April 15, 1921. The automatic speed governing means proper comprise a vane 39 carried by a collar 40 slidable on the engine shaft 5. Collar 40 embraces a radius rod or curved tongue 41, which lies in a notch 42 in the engine shaft and is secured at its inner extremity to the cross head 6. As the interior of the housing is to be filled normally with a liquid lubricant, the frictional engagement of collar 40 on the engine shaft and the resistance of the liquid will cause the vane 39 to creep outwardly on the shaft with an increase in engine speed. This action depresses the forward portion of radius rod 41 and raises its rearward extremity, connected with cross head 6, so that the pin 8 is moved from the centers of slots 7 and 9 a distance corresponding to the increase in engine speed. This in turn increases the length of stroke of pin 8 and of slide 10. As the speed of rotation of wheel 2 remains unaffected by this adjustment, the speed of movement of slide 10 is increased with increase in the length of its stroke. The pull is of course correspondingly decreased.

With decreased engine speed, the collar 40 may be drawn inwardly by means of a spring against the resistance of which the vane 39 moves outwardly. This inward movement of collar 40 serves to depress the inner extremity of radius rod 41, thus moving cross head 6 toward the center of slot 7, and the pin 8 toward the centers of slots 7 and 9. The speed of movement of slide 10 and worm gear 18 is thus decreased but the pull increased.

Thus if the mechanism be applied to a power propelled vehicle; the slowing of engine speed when the vehicle is on an upgrade will automatically cause the pull for taking the grade to be increased. Upon speeding up of the engine when the summit of the hill has been reached, the creeping of vane 39 will cause the speed of rotation of the power shaft to be increased.

This arrangement automatically reduces the speed of rotation of the power shaft only the amount necessary to secure the pull requisite under the existing grade, condition of the roadway, etc. This is possible because there are no fixed steps, as with a gear assembly, but on the contrary all changes are gradual and without noticeable graduation. This fact, in itself, avoids shocks and jars to the entire structure of the car.

It will also be understood that when the pitman pin 8 is in the exact center of the slots 7 and 9, the effect will be the same as that obtained with the "neutral" of the ordinary clutch. That is, the engine will run free of the load as the pin 8 will merely rotate in the slots without exerting any force upon the slide 10.

As illustrated in Figures 4 and 5 means are provided for bringing the mechanism into "neutral" and for controlling the speed at the will of the operator, these means being so arranged as to normally interfere in no way with the automatic speed regulation. To give this independent control a yoke 43 carried by a lever 44 is secured by a ring 45 set in collar 40 and slidable therein. This lever has a rotatable connection in the housing 1 and is also hinged to a horizontal link 46. Horizontal link 46 is in turn joined to an operating rod 47 which carries a pedal 48. To the extremity of horizontal lever 46 is secured coiled spring 49 which normally resists outward movement of vane 39 and collar 40. Depression of pedal 48 causes inward movement of collar 40 to decrease the speed transmission or to place the operating pin 8 in "neutral" position; while release of the pedal permits governing vane 39 to exercise its normal effect.

It will be understood that the automatic speed regulating means are applicable to any mechanism in which a pin is adjustably mounted in a driving wheel and arranged to act upon a reciprocable member. It is particularly adapted to use with the other members of the mechanism shown and described herein, because such other members are likewise simple, compact, and well suited to use in a power propelled vehicle.

As the device is susceptible of a number of modifications, both as to form and arrangement, without departing from the spirit of the invention; the scope of the invention is to be restricted only by the limitations contained in the claims appended hereto.

What I claim is:

1. An adjustable crank pin comprising a driving shaft, a driven wheel, a reciprocable member, a pin adjustably mounted in said wheel and extending into a slot in said reciprocable member, a vane mounted on said driven shaft and arranged to creep outwardly thereon, means arranged to be operated by said vane to move the pin away from the center of said wheel, and resilient means exerting a force tending to move said pin toward the center of said wheel.

2. An adjustable crank pin comprising a driving shaft, a driven wheel, a reciprocable member, a pin adjustably mounted in said wheel and extending into a slot in said reciprocable member, a curved operating rod secured to said pin, automatic means arranged to act upon said curved operating rod to move the pin away from the center of said wheel, and resilient means arranged to exert a force tending to move the pin toward the center of the wheel.

3. An adjustable crank pin comprising a driving shaft, a driven wheel, a reciprocable member, a pin adjustably mounted in said wheel and extending into a slot in said reciprocable member, a curved operating rod secured to said pin and lying within a slot in said driven shaft, a collar on said shaft and embracing said curved operating rod, a vane on said collar for causing creeping of the same with increase in the speed of revolution of said driving shaft, and resilient means exerting a force tending to move said pin toward the center of said wheel.

4. An adjustable crank pin comprising a driving shaft, a driven wheel, a reciprocable member, a pin adjustably mounted in said wheel and extending into a slot in said reciprocable member, automatic means for moving said pin away from the center of said wheel, and independent means operable at will for moving the pin toward the center of the wheel.

5. An adjustable crank pin comprising a driving shaft, a driven wheel, a reciprocable member, a pin adjustably mounted in said wheel and extending into a slot in said reciprocable member, means operated by revolution of the driving shaft for moving said pin away from the center of said wheel, resilient means exerting a force tending to move said pin toward the center of the wheel, and independent means operable at will for moving the pin toward the center of the wheel.

6. An adjustable crank pin comprising a driving shaft, a driven wheel, a reciprocable member, a pin adjustably mounted in said wheel and extending into a slot in said reciprocable member, a vane mounted on said driving shaft and arranged to creep outwardly thereon, means arranged to be operated by said vane to move the pin away from the center of said wheel, resilient means exerting a force tending to move said pin toward the center of said wheel, and independent means operable at will for moving the pin toward the center of the wheel.

7. An adjustable crank pin comprising a driving shaft, a driven wheel, a reciprocable member, a pin adjustably mounted in said wheel and extending into a slot in said reciprocable member, a curved operating rod secured to said pin, automatic means arranged to act upon said curved operating rod to move the pin away from the center of said wheel, resilient means arranged to exert a force tending to move the pin toward the center of the wheel, and independent means operable at will for moving the pin toward the center of the wheel.

8. An adjustable crank pin comprising a driving shaft, a driven wheel, a reciprocable member, a pin adjustably mounted in said wheel and extending into a slot in said reciprocable member, automatic means for moving said pin away from the center of said wheel, resilient means exerting a force tending to move the pin toward the center of the wheel, and independent means operable at will for moving the pin toward the center of the wheel.

9. An adjustable crank pin comprising a driving shaft, a driven wheel, a reciprocable member, a pin adjustably mounted in said wheel and extending into a slot in said reciprocable member, means operated by revolution of the driven shaft for moving said pin away from the center of said wheel, means for resisting movement of the pin away from the center of the wheel, and means operable independently for moving the pin toward the center of the wheel.

In witness whereof, I hereunto set my hand.

ROBERT E. WINTERS.

Witnesses:
  E. M. DWYER,
  E. B. WALTERS.